May 11, 1943.   J. P. SPANG   2,318,897
MEAT-SLITTING MACHINE
Filed Jan. 27, 1942   2 Sheets-Sheet 1
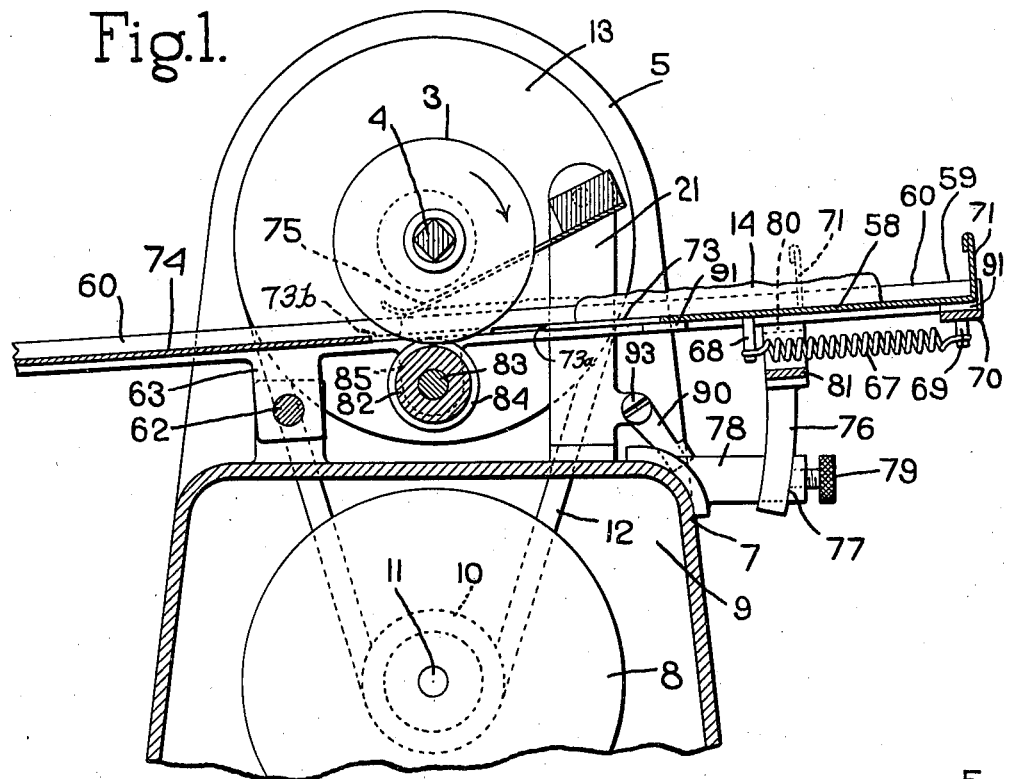
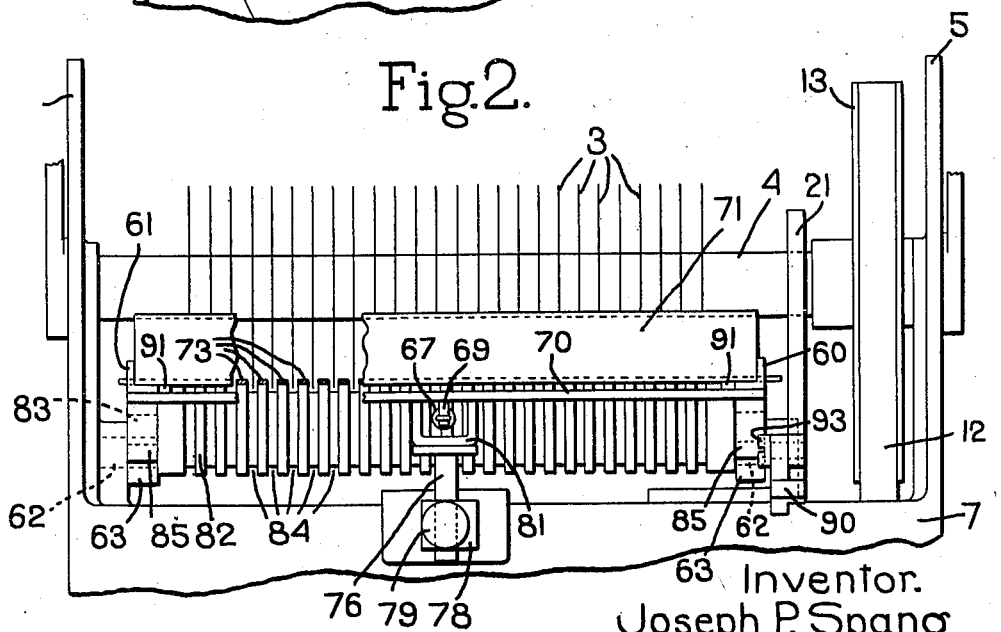
Inventor.
Joseph P. Spang
by Heard Smith & Tennant
Attys.

May 11, 1943.                J. P. SPANG                2,318,897
                        MEAT-SLITTING MACHINE
                        Filed Jan. 27, 1942              2 Sheets-Sheet 2
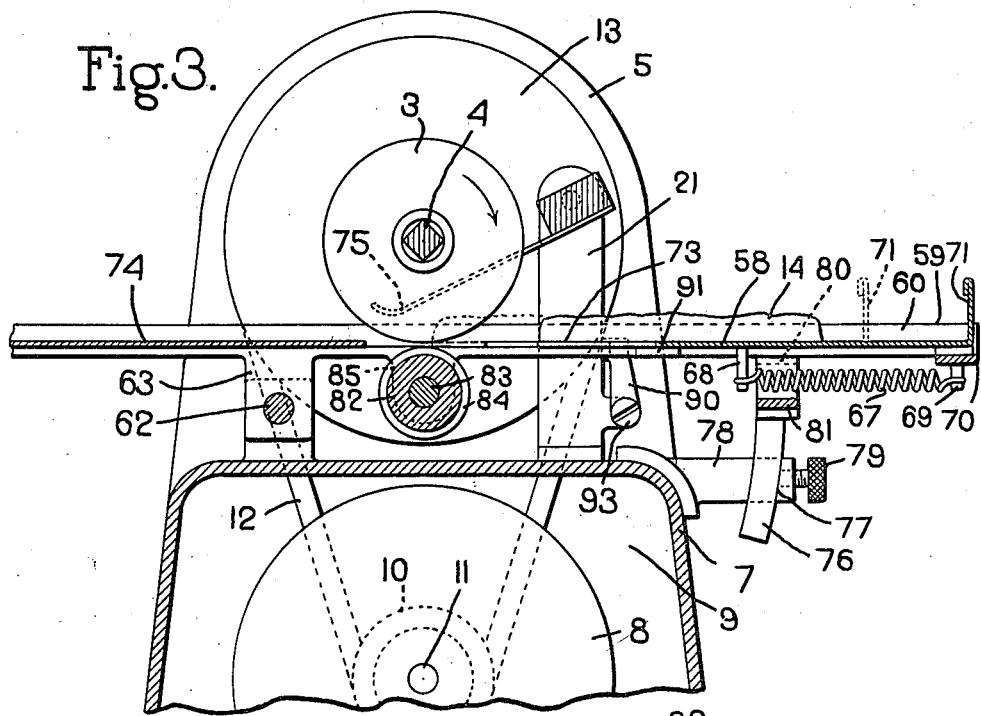
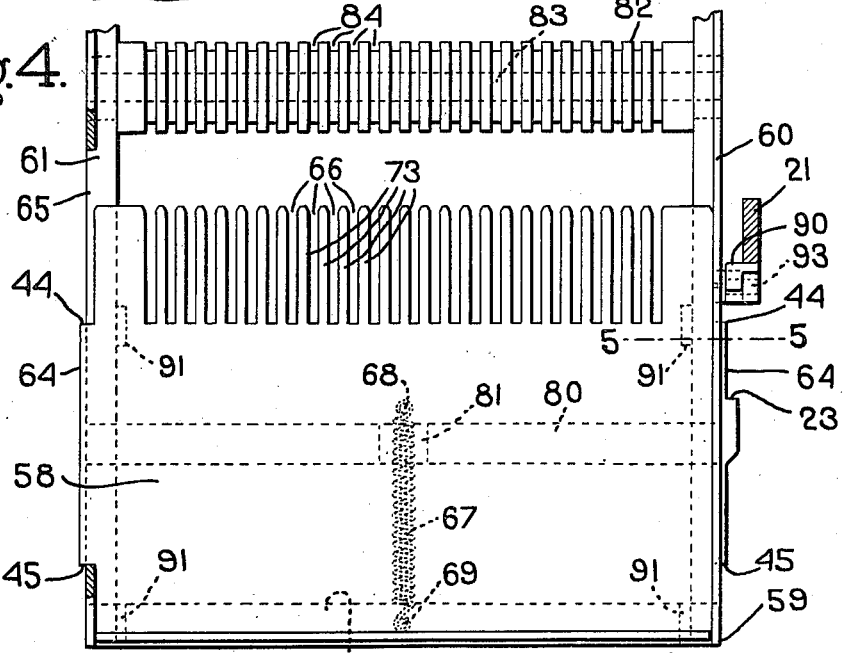
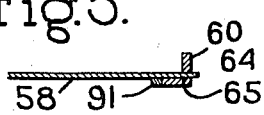
Inventor.
Joseph P. Spang
by Heard Smith & Tennant
                                Attys.

Patented May 11, 1943

2,318,897

UNITED STATES PATENT OFFICE 2,318,897

MEAT-SLITTING MACHINE

Joseph P. Spang, Quincy, Mass., assignor to Cube Steak Machine Company, Inc., Boston, Mass., a corporation of Massachusetts Application January 27, 1942, Serial No. 428,357

2 Claims. (Cl. 17—26)

This invention relates to meat-slitting machines of that type which comprises a set of rotary slitting knives and a reciprocatory meat-supporting member for feeding to the knives a slice of meat to be slit.

One of the objects of the invention is to provide a novel machine of this type in which the slice of meat to be slit is supported on a reciprocatory table that is manually moved forwardly into position to deliver the slice to the slitting knives and is then automatically returned to its initial position by means of a spring.

Further objects of the invention are to provide a novel machine of this type which is constructed so that in one adjustment thereof the knives will cut clear through the slice, thus cutting it into strips, while in another adjustment the knives will cut part way only through the slice, thereby leaving a film of uncut meat on the bottom face of the slice.

In the drawings wherein I have illustrated a selected embodiment of the invention, Fig. 1 is a sectional view through a meat-slitting machine embodying my invention.

Fig. 2 is an end view of Fig. 1 with a part broken out.

Fig. 3 is a figure similar to Fig. 1 but illustrating the meat supporting member adjusted for cutting slits part way only through the slice of meat.

Fig. 4 is a sectional view showing the meat-supporting plate in plan.

Fig. 5 is a section on the line 5—5, Fig. 4.

In the device shown in the drawings, 3 indicates a plurality of rotary disk knives for slitting the meat which are mounted on a knife shaft 4 that is journaled in uprights 5 and 6 rising from the frame 7 of the machine. These knives are given their rotative movement by means of a motor 8 which is located in a motor chamber 9 with which the frame 7 is provided, said motor having a driving pulley 10 on its shaft 11, which pulley is belted to a driving pulley 13 on the knife shaft 4 by means of a driving belt 12.

58 designates a reciprocatory meat-supporting plate which is adapted to support the slice 14 of meat to be slit and feed the latter to the rotary knives 3 which are rotating in the direction of the arrow shown in Figs. 1 and 3.

This meat-supporting plate 58 is slidably mounted on a supporting member 59 comprising two side rails 60 and 61, which are pivotally mounted, each having an ear 63 depending therefrom which is pivoted to the frame as shown at 62. The side rails 60 and 61 are shown as having an angle iron shape and the meat-supporting plate 58 rests on the horizontal legs thereof. This meat-supporting plate is formed at each side with a wing 64 which extends through a slot 65 formed in the vertical leg of the corresponding side rail. Said plate is also provided with depending lugs 91 which engage the inner edges of the side rails. Said wings, slots, and lugs serve as guiding means for the plate 58 during its reciprocating movement. The plate 58 is provided at its forward end with a series of slots 66 which form fingers 73, said slots having the same spacing as the knives 3.

The meat-supporting plate 58 is acted on by a spring 67 which yieldingly holds it in retracted position, shown in Fig. 1, one end of the spring being secured to a pin 68 depending from the plate 58, and the other end being connected to a pin 69 depending from a cross-bar 70 by which the side rails are tied together.

The plate 58 is intended to be manually moved forwardly to feed a slice 14 of meat to the knives, and to provide for this, the outer edge of said plate is upturned, as shown at 71, to form a suitable hand-hold which the operator may use in manually moving the plate.

The reciprocatory movement of the plate is limited by the engagement of stop shoulders 44, 45 on the wings 64 with the ends of the slots 65. The engagement of the shoulders 45 with the outer ends of the slots 65 limits the backward or spring-impelled movement of the plate 58 and the engagement of the stop shoulders 44 with the inner ends of the slots 65 limits the forward feeding movement of said plate 58.

When a slice 14 of meat is to be slit, it is placed on the plate 58, as shown in Fig. 1, and then the operator applies forward pressure to the upturned portion 71, thereby moving the plate forwardly against the action of the spring 67 to bring the slice 14 of meat into a position to be acted on by the knives 3. As soon as the knives enter the meat, the friction of the knives against the meat will feed the meat forward or to the left, Fig. 1, and the slit meat will be delivered onto the platform 74 which is carried by the supporting member 59 and is located on the delivery side of the knives.

75 indicates stripper fingers which are located between the knives and which strip the meat from the knives.

Situated beneath the knives is a supporting roll 82 which is loosely mounted on a shaft 83 that is carried in bearings 85 depending from the side rails 60, 61. This roll is provided with peripheral grooves 84 which have the same spacing as the knives 3.

The device shown is capable of being set so as the cut a slice of meat into separate strips, or to be set so as to cut slits partially but not entirely through the slice, thereby leaving a film of unslit meat on the bottom of the slice. This is provided for by the pivotal mounting of the supporting member 59. Fig. 1 shows an adjustment of the member 59 which will result in cutting the slice 14 into separate strips. In this adjusted position, the lower edges of the knives 3 dip into the grooves 84 of the roll 82, and, when the plate 58 is moved forwardly, the knives will enter the slots 66 of the plate and will cut entirely through the meat, thus cutting the slice 14 into strips. The stop shoulders 44 are so located that, when the plate 58 is at the forward limit of its movement as shown in dotted lines Fig. 1 the ends of the fingers 73 will be in engagement with the edge of the platform 74 as indicated at 73b, and the knives 3 will be operating in the slots 66, but will not engage the rear end of the slots. As stated above, as soon as the slice of meat is carried forward into the dotted line position, Fig. 1, so that the rotating knives are acting on the meat, the friction of the knives on the meat will feed the meat forward and withdraw it from the plate 58 and deliver it onto the platform 74. As soon as the slice 14 has been slit, then the operator releases his hold on the plate 58 and the spring 67 returns the plate to its initial position. The position of the ends of the fingers 73 in the full and dotted line positions of the plate 58 in Fig. 1 are indicated at 73a and 73b respectively.

An adjustment of the member 59 adapted for cutting slits part way but not entirely through the slice 14 is shown in Fig. 3. In this adjustment, the right-hand end of the support 59 is swung downwardly so as to separate the roll 82 from the knives 3. With this adjustment, as soon as the plate 58 has been moved forwardly sufficiently to bring the forward end of the slice 14 into position to be acted on by the knives, as shown by dotted lines, Fig. 3, the action of the knives on the meat will serve to pull the meat forward from the plate 58 and feed it through the machine onto the receiving platform 74, the slice moving over the roll 82. Since the roll 82 is slightly spaced from the knives, the latter will cut slits part way but not entirely through the slice, and the slice 14 will be delivered onto the platform 74 with a plurality of slits cut in its upper face and with a film of unslit meat on the bottom face.

The thickness of the unslit film of meat on the bottom of the slice is determined by the relative positions of the knives 3 and the element on which that portion of the slice being acted on by the knives is supported, and in order to provide that this unslit film shall be of uniform thickness from the front to the rear edge of the slice I have provided a construction wherein when the machine is adjusted for cutting slits which extend part way only through the slice that portion of the slice being acted on by the knives will be supported by the roll 82 rather than by the reciprocating plate 58.

As stated above Fig. 3 shows the position into which the supporting member is adjusted for cutting slits which extend part way but not entirely through the slice 14 and means are provided whereby when the supporting member is thus adjusted the forward movement of the plate 58 will be terminated while the ends of the fingers 73 or the leading edge of the plate is still on the input side of the roll 82, as shown by dotted lines Fig. 3, so that when the slice is pulled off from the plate 58 by the engagement of the knives therewith the portion of the slice which is being acted on by the knives will be resting on and be supported by said roll 82. When the machine is used in this way, the slice 14 of meat will be placed on the plate 58 so that the leading edge of the slice is located at the ends of the fingers 73, in which case the movement of the plate into the dotted line position, Fig. 3 will carry the forward or leading edge of the slice into a position to be acted on by the knives, and as stated above, as soon as the knives begin to cut into the meat, the friction of the knives on the meat will feed it forward and deliver it onto the platform 74.

As the slice of meat moves forward from the plate 58 to the platform 74 the portion of the slice which is being acted on by the knives 3 will be supported by the roll 82 and thus the slits formed in the slice will be of uniform depth from the leading to the trailing edge thereof.

The means for thus limiting the forward feeding movement of the plate 58 when the parts are adjusted into the position shown in Fig. 3 comprises a stop dog 90 pivotally mounted at 93 to a post 21 carried by the frame and which forms one of the supports for the stripper fingers 75. When this stop is swung upwardly into its operative position shown in Fig. 3, it rests against the post 21 and is situated to engage a stop shoulder 23 formed on one of the wings 64.

This stop dog is used only when the machine is adjusted to cut slits part way but not entirely through the slice. When the machine is adjusted, as shown in Fig. 1, to cut entirely through the slice, then the stop dog 90 will be swung downwardly into its inoperative position shown in Fig. 1.

Any approved means may be provided for retaining the supporting member 59 in any adjusted position. As herein shown, said supporting member is provided with a depending finger 76 which is received in a slot 77 formed in a bracket arm 78 extending from the frame. Said arm carries a set screw 79 by which the finger 76 may be clamped in any adjusted position, thereby holding the swinging support 59 in its adjusted position. This finger 76 is shown as depending from a cross-bar 80 extending from one side rail to the other, said cross-bar having the dropped portion 81 from which the finger 76 depends. This drop portion 81 provides a channel in which the spring 67 may operate.

I claim:

1. A meat-slitting machine comprising a set of rotary knives, means to rotate the knives, a supporting member, a manually operable meat-supporting plate slidably mounted on the supporting member and adapted to feed a slice of meat to the knives, a peripherally grooved roll carried by the supporting member and situated beneath the knives, said supporting member being adjustable toward and from the knives between a position in which the knives dip into the grooves of the roll and a position in which the roll is spaced from the knives, and a stop operable when the supporting member is adjusted into the latter position to limit the forward or feeding movement of the meat-supporting plate to a position in which the leading edge thereof is on the input side of said roll, whereby as the slice of meat is fed forward past the knives the portion of the meat which is acted on by the knives will be supported by said roll.

2. A meat-slitting machine comprising a set of rotary knives, means to rotate the knives continually in one direction, a supporting member pivoted to turn about an axis at one side of the vertical plane of the axis of the rotary knives, a meat-slitting plate slidably mounted on said supporting member and adapted for manual movement independent of the knives to feed a slice of meat to said knives, a peripherally grooved roll rotatably mounted on the supporting member, turning movement of said supporting member about its axis shifting the roll into either a position in which the knives dip into the groove or into a position in which the roll is spaced from the knives, and a stop operable when the supporting member is adjusted into the latter position to limit the feeding movement of the meat-supporting plate to a position in which the leading edge threof is on the input side of said roll, whereby as the slice of meat is fed forward past the knives, the portion of the meat which is acted on by the knives will be supported by said roll.

JOSEPH P. SPANG.